June 3, 1969     J. S. GASSAWAY     3,448,457

MONITORING AND RECORDING SYSTEM

Filed Oct. 11, 1965     Sheet 1 of 3

JAMES SCOTT GASSAWAY,
INVENTOR.

By Knight & Rodgers
ATTORNEYS.

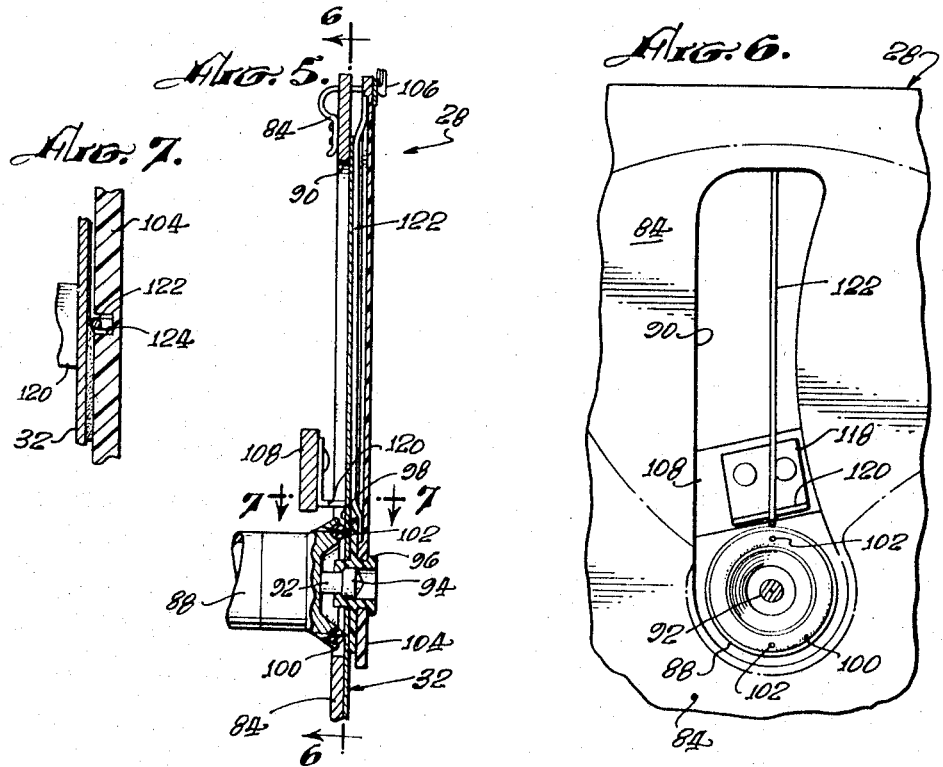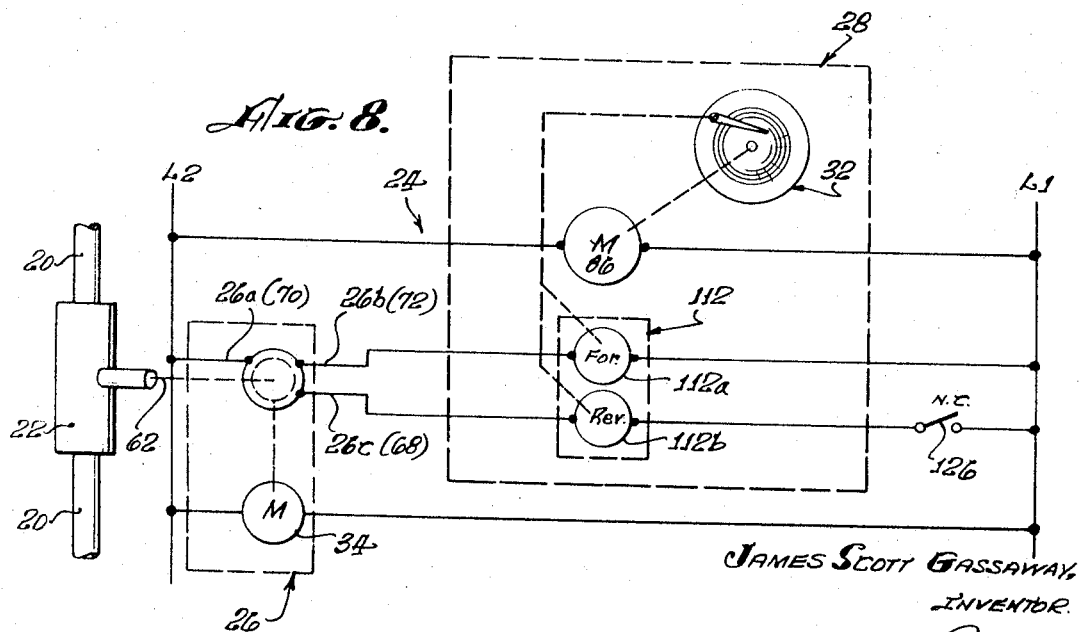

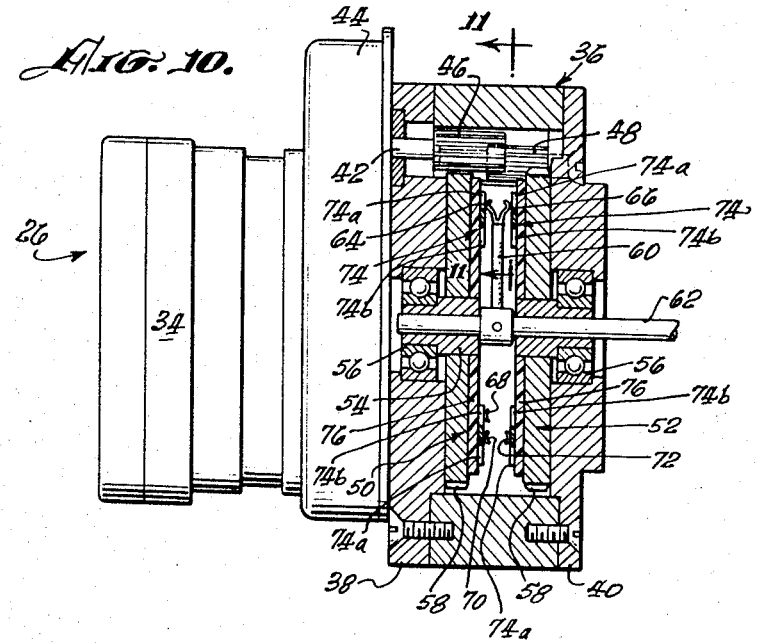
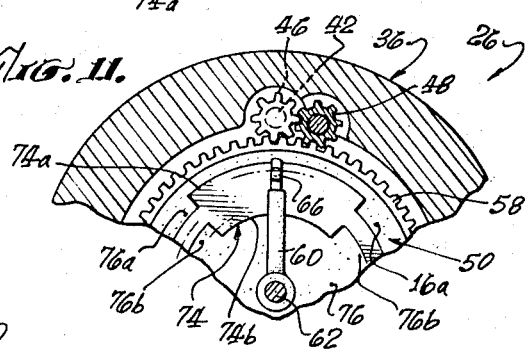
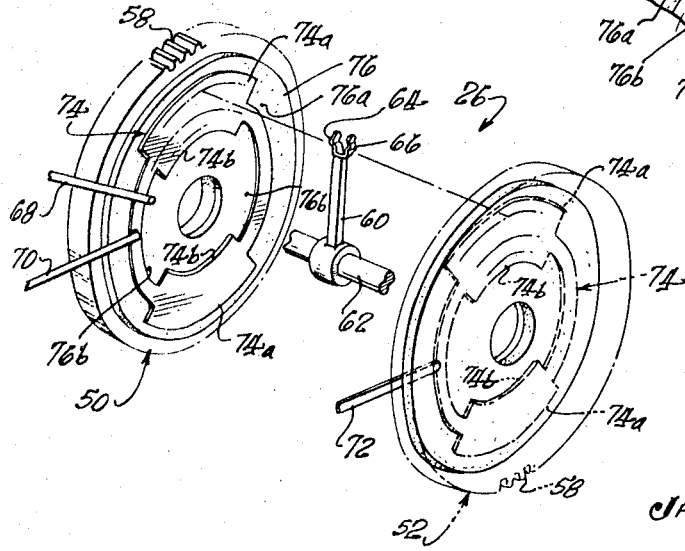
INVENTOR.
JAMES SCOTT GASSAWAY,
ATTORNEYS.

United States Patent Office 3,448,457
Patented June 3, 1969

3,448,457
MONITORING AND RECORDING SYSTEM
James Scott Gassaway, Los Angeles, Calif., assignor to Hersey-Sparling Meter Company, El Monte, Calif., a corporation of Massachusetts
Filed Oct. 11, 1965, Ser. No. 494,624
Int. Cl. G01d 9/12
U.S. Cl. 346—1                                    23 Claims

ABSTRACT OF THE DISCLOSURE

A remotely monitored variable quantity, such as water flow or level, is translated into a control signal of the time-duration type, each signal being composed of a series of cycles at constant frequency and equal time duration. Each cycle in turn comprises a variable member of electric pulses occuring at a constant frequency so that the quantity is measured by the number of pulses. The signal is produced by a special signal generator and is recorded at any suitable distant point.

---

The present invention relates generally to the art of monitoring an input function and producing an output function which varies in a predetermined manner with respect to the input function in order to measure the input function. The invention relates more particularly to a novel monitoring method and means of the class described wherein the input function is converted to a control signal of which the time duration characteristic is modulated in response to changes in the input function; and the output function is of a nature that permits recording in visible form.

The term "signal" is used herein to refer to a series of cycles occurring over the period of taking measurements. A cycle is the period of time from the beginning of one measurement of the beginning of the next measurement. Each cycle in turn includes a plurality of individual pulses. The pulses in each cycle are modulated in the desired manner in response to the input function to give to the signal a characteristic that can be recognized and interpreted as a measurement of the input function during each cycle. Hence, the signal may be considered to have time duration aspects or characteristics that are recognizable and can be used to transmit information periodically during the time that the signal continues to be received.

Of the more commonly used monitoring systems, two can be classified, in a general manner, either as a time-frequency system or as a time-duration system. These two types of systems are similar in that each produces a control signal, ordinarily an electric signal, one characteristic of which is modulated in response to changes in the input function. In a time-frequency system, the signal is typically a periodic signal; and is termed a time-frequency signal because the frequency, i.e., the number of signals per unit time, is modulated in response to changes in the input function. In a time-duration system, on the other hand, the signal is one of which a time-length or time-duration characteristic is modulated in response to changes in the input function. The present invention relates to a time-duration system. Each of these two types of systems presents advantages over the other type, the time-frequency systems being better suited to certain monitoring applications, and the time-duration systems being better suited to other monitoring applications.

Consider, briefly, the merits of these two types of systems as applied to monitoring or measuring flow rate and total volume of flow in a fluid conduit. In this application, a time-frequency system usually produces a signal having a frequency related to flow rate in such manner that each segment or pulse of the signal represents a given unit volume of the fluid being monitored. A control signal of this kind may be easily converted to total volume of flow during any given time interval of measurement, by simply counting the number of signal pulses which occur during the interval. This may be easily accomplished with an electro-magnetic counter, for example. On the other hand, it is a more sophisticated task, involving differentiation, to convert this total volume measurement into a flow rate measurement.

In a similar situation, a time-duration system produces a signal having a time duration characteristic proportional to flow rate. It is a relatively simple task to convert such a time-duration signal to a flow rate measurement by measuring the time length of appropriate segments of the signal; but it is a more difficult task, involving integration, to convert the signal to a total volume measurement. Stated another way, a time-frequency signal may be simple to totalize but difficult to translate into a rate. A time-duration signal, on the other hand, may be simple to translate into a rate, but difficult to totalize. Accordingly, most known time-duration systems are better suited to monitor or measure rate functions, such as rate of flow.

One object of the invention is to provide a new and novel method and means for utilizing a time-duration signal to produce an output related in a predetermined manner to a monitored input function which modulates the signal.

Another object of the invention is to provide a unique method of and means for recording a variable input function.

Yet another object of the invention is to provide a novel signal generator for generating a variable time duration type of output signal.

Another object of the present invention is to generate a signal of the time-duration type having digital characteristics for improved accuracy of measurement of the input function.

A further object of the invention is to provide a unique recorder wherein, in contrast to conventional recording practice, the movable recording member engages the rear of the recording chart, thereby leaving the front face of the chart exposed for observation and reading without parallax error.

Other objects, advantages, and features of the invention will become readily apparent as the description proceeds.

Briefly, according to the present invention, the input function to be monitored is translated, by a novel signal generator, into a control signal composed of a series of cycles which occur at constant frequency and are of equal time duration. Normally, but not necessarily, the cycles are consecutive. Each cycle comprises a plurality of pulses occurring at a constant frequency. In each cycle a group of such pulses is related to the variable input function, more particularly the number of pulses in the group is varied to measure the input function.

Viewed in another way, each cycle may be considered to be composed of two successive increments of time having together a total time duration equal to the time duration of the cycle; and in each cycle one increment corresponds to said group of pulses. The signal generator is made responsive to the input function in such manner as to vary the time duration of selected time increments, or groups of pulses of the control signal in such manner that the time durations of said given increments vary in predetermined relation to the input function. In the ensuing description, the modulated time increment of each cycle is also referred to as the measuring group of pulses; and, in the illustrated embodiment, the remaining increment of the cycle contains the return group of pulses. The illustrated signal generator of the invention is constructed to produce a control signal in which each measuring cycle includes a measuring group of pulses of which the number, and hence the time duration of the group, varies directly with the input function.

The signal from the signal generator is converted to an output, preferably a mechanical motion, related to the time duration of the selected pulse groups of the signal. In the illustrative embodiment of the invention, for example, the signal from the generator is delivered to a recorder having an oscillatory recording member which moves back and forth across a recording chart to produce a trace thereon. Each cycle is effective to drive this recording member in one direction, from an initial position thereof, for a distance proportional to the time duration of the measuring pulse groups of the cycle. In the remainder of the cycle the recording member is returned to its normal position. This return is preferably accomplished by signal pulses in the same cycle but outside the measuring or modulated pulse group; but other means, either electrical or mechanical, for returning the recording member may be used. The recording member is thus continuously oscillated back and forth across the recording chart by the control signal. The recording chart is, in turn, driven at a constant speed in a direction transverse to the direction of motion of the recording member, whereby the oscillatory movement of the recording member produces a trace on the chart related to the input function. The recorder of the invention is constructed in such manner that the measurement thus recorded on the recording chart is defined by the boundary between two contrasting areas or fields on the chart in a manner which permits the chart to be accurately read from relatively great distances.

Another feature of the recorder resides in the fact that the recording member engages the rear side of the recording chart and cooperates with certain structures of the recorder to produce a trace on the front recording surface of the chart. The visible surface, thereby, is not obscured by the recording member and may be read from any position. This unique recorder construction also permits a transparent plate, with an inscribed scale for reading the chart, to be placed over the chart with its inscribed scale in contact with the recording surface of the chart, whereby the latter may be read from any angle without parallax error.

The invention will now be described in greater detail by reference to the attached drawings, wherein:

FIG. 5 is an enlarged fragmentary vertical section on line 5—5 of FIG. 1.

FIG. 6 is an enlarged fragmentary front elevation of the chart mounting and marking means, as on line 6—6 of FIG. 5, with the chart removed.

FIG. 7 is a fragmentary horizontal section on line 7—7 of FIG. 5.

FIG. 8 is a schematic circuit diagram of the monitoring and recording system.

FIG. 10 is a combined longitudinal median section and elevation through the novel form of signal generator embodying the present invention.

FIG. 11 is a fragmentary vertical section on line 11—11 of FIG. 10.

FIG. 12 is an exploded perspective diagram of the stationary and rotating contacts inside the signal generator.

Figure 1:
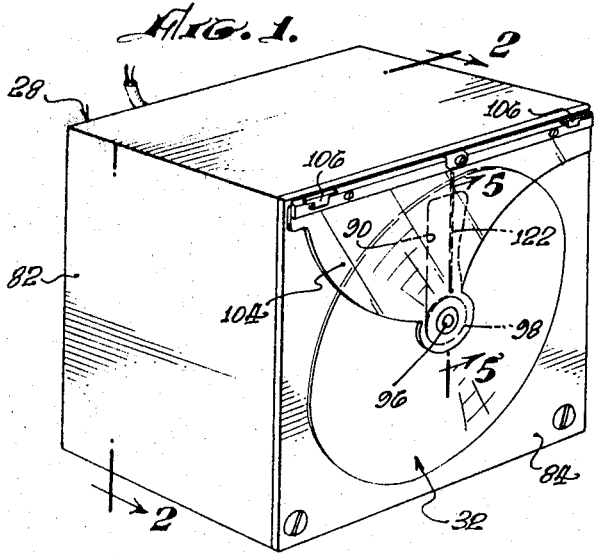
FIG. 1 is a perspective view of a novel form of signal recording apparatus forming a part of my improved monitoring and recording system.

As mentioned earlier, the monitoring method and means of the invention may be used for a variety of purposes and to monitor various input functions, such as pressure, temperature, mechanical movement, liquid head, flow rate and so on. The illustrated embodiment of the invention, however, will be described in connection with its use in monitoring the rate of flow of fluid through a conduit 20. In this case, a flow rate sensing means, or transducer 22 is placed in the conduit to respond to fluid flow through the conduit. The present monitoring system or instrument 24 comprises a signal generator 26 which has an input shaft 62 coupled to the output from the flow rate transducer 22, in the manner explained later, and which generates an output control signal related in a known manner to the rate of flow in the conduit 20. As will become apparent from the later description, any type of flow rate transducer capable of operating the signal generator 26 in the manner hereinafter explained may be used with the present monitoring instrument 24. One type of transducer which is suitable for this purpose, for example, is a flow rate meter including a rotating shaft displaced angularly by the fluid stream from a starting or zero position by an angle proportional to the stream velocity.

Figure 4:
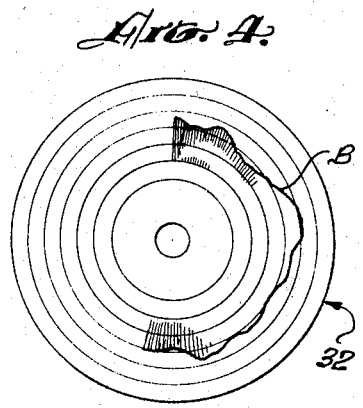
FIG. 4 is a front elevation of a recording chart illustrating the type of novel record produced by the apparatus.

As mentioned earlier and hereinafter more fully explained, the signal generator 26 produces an output signal composed of a series of cycles of constant frequency and time duration, each of which cycles comprises two successive increments of time ($T_1$ and $T_2$ in FIG. 9) whose total time duration equals the time duration of one cycle C. Selected alternate time increments $T_1$ of the control signal define measuring periods, each comprising a group of pulses of constant frequency, of which periods the time duration varies in predetermined relation to the input function being monitored, namely, the flow rate in conduit 20. Also included in the present monitoring system 24 is a recorder 28 (FIG. 1) having an oscillatory recording member 30 and a chart 32 which is engaged by the recording member and driven, at a constant speed, in a direction transverse to the direction of the oscillatory motion of the recording member. The recorder 28 has its input shaft 62 coupled to the output of the signal generator 26 in such manner that each measuring time increment $T_1$ of the control signal output from the generator is effective to drive the recording member 30 in one direction from a given starting position thereof and during each intervening time increment $T_2$ the control signal is effective to drive the recording member in the opposite direction back to its starting position. This oscillatory motion of the recording member 30 across the chart 32 creates, in effect, a two-tone recorded chart of the kind shown in FIG. 4, having two contrasting areas or fields, the demarcation or boundary B between which defines the recorded value of the monitored input function, or flow rate in conduit 20.

The signal generator 26 will now be described in greater detail by reference to FIGS. 10–12. This signal generator comprises a synchronous motor 34 at one side of which is secured a hollow housing 36 including a pair of spaced parallel end walls 38 and 40. Journaled in the wall 38 is output shaft 42 which is driven from the motor 34 through reduction gearing enclosed in the forward portion 44 of the motor housing. A pinion 46 keyed or otherwise fixed on the shaft 42 meshes with a second pinion 48 of equal diameter (FIG. 11) which is rotatably supported in the housing walls 38, 40, in laterally offset relation to the pinion 46. Located between the two housing walls 38, 40 are two similar coaxial discs 50 and 52 each having a central hub 54 which is rotatably supported, by a ball bearing 56, in the adjacent housing wall 38 or 40.

The two discs 50, 52 rotate on a common axis parallel to the axes of the pinions 46, 48. About the peripheral edge of each disc are gear teeth 58. The gear teeth 58 on the disc 52 mesh with those on pinion 48. It is apparent at this point, therefore, that when the motor 34 of the signal generator is energized, the two discs 50 and 52 are driven by pinions 46 and 48 at equal speeds in opposite directions or rotation about their common axis.

Between the discs 50 and 52 is a rotary contact arm 60 which is fixed to shaft 62 extending coaxially through and journaled in the central hubs 54 of the discs. One end of the shaft 62 extends outwardly beyond the side wall 40 of the housing 36, for connection to transducer 22. It is apparent, therefore, that turning shaft 62 is effective to rotate or angularly displace the switch arm 60 relative to both discs 50, 52. Mounted on the switch arm 60 are two electrical contacts 64 and 66 which are electrically connected to each other. These contacts may comprise, for example, metallic spring brushes which are biased outwardly against the discs 50, 52 in such manner that the contact 64 bears against disc 50 and the contact 66 bears against disc 52.

Mounted on the housing 36 (see FIG. 10) are three stationary contacts 68, 70 and 72. These stationary contacts, which may be metallic spring contact brushes, are disposed between the discs 50, 52 in such manner that the contacts 68 and 70 bear against disc 50, and the contact 72 bears against the disc 52.

As shown best in FIG. 12, the inner surface of each disc 50 and 52 carries an annular, electrical contact designated generally 74. In the drawings, each disc 50 and 52 is shown to comprise an insulating layer 76 on its inner face. The conductive surface 74 is applied over the inner face of this insulating layer. Discs 50 and 52 may be provided with the conductors 74 in various ways. According to the preferred practice of the invention, however, these conductive surfaces are formed on the discs by a conventional printed circuit technique.

As shown in FIG. 12, each contact 74 includes a first pair of outer diametrically opposed conductive segments 74a each having an angular extent slightly less than 90°. In the drawings, for example, each conductive segment 74a is shown to have an angular extent of about 85°. Between the conductive segments 74a are diametrically opposed insulating segments 76a each having an angular extent slightly in excess of 90°. The illustrated insulating segments 76a, for example, are 95° in angular extent. Each conductive surface 74 includes a second pair of inner diametrically opposed conductive sectors 74b each having an angular extent of approximately 90°. The conductive sectors 74b define therebetween a pair of diametrically opposed insulating sectors 76b of 90° angular extent. It will be observed that the trailing edges of each pair of adjacent sectors 74a, 74b on each disc 50 and 52, relative to the indicated direction of rotation of the disc, are radially aligned. Each conductive surface 74 includes a continuous conductive ring which is a full 360° in angular extent. The conductive sectors 74a and 74b on each disc 50 and 52 are integral with the corresponding conductive ring, whereby an electrical circuit may exist between the ring and each conductive sector on each disc.

The contacts 64 and 66 on the angularly adjustable contact arm 60 are located at the same radial distance from the axis of rotation of the discs 50, 52 as the conductive sectors 74a on the discs. Accordingly, when the discs are driven in rotation in the manner explained earlier, the contacts 64, 66 alternately engage the conductive sectors 74a and the insulating sectors 76a of their respective discs. The radial spacing of the stationary contact 68 from the axis of rotation of the discs is equal to the radial spacing of the inner conductive sectors 76b from the axis. Accordingly, when the discs are driven in rotation, the stationary contact 68 alternately engages the conductive sectors 74b and the insulating sectors 76b of the disc 50. In actual practice, the conductive sectors 74b of the other disc 50 are not used and, accordingly, may be omitted. It is apparent, however, that if both discs are provided with the conductive sectors 74b, the two discs are duplicates and thereby are interchangeable. This facilitates manufacture and assembly of the instrument. The remaining two stationary contacts 70 and 72 are located at the same radial distance from the axis of the discs as the conductive ring, whereby the contact 70 remains in continuous electrical contact with the conductive surface 74 on the disc 50 and the contact 72 remains in continuous electrical contact with the conductive surface 74 on the disc 52.

It is apparent from the foregoing description of the signal generator 26 that when the angularly adjustable contacts 64, 66 simultaneously engage the conductive sectors 74a of their respective discs 50, 52, an electrical circuit is completed from one stationary contact 70, through the conductive surface 74 on its respective disc 50, the angularly adjustable contacts 64, 66, and the conductive surface 74 on the other disc 52, to the other stationary contact 72. When the stationary contact 68 engages one or the other of the conductive sectors 74b on its respective contact disc 52, a circuit is completed from the contact 70, through the conductive surface 74 on the disc 50, to the stationary contact 68.

Referring now to FIG. 8, it will be observed that the signal generator 26 has three external terminals 26a, 26b and 26c. Terminal 26a connects to the stationary contact 70, terminal 26b connects to the stationary contact 72, and the terminal 26c connects to the stationary contact 68.

The recorder 28 will now be described in detail by reference to FIGS. 1–7. The recorder is contained within a housing 82 having a front wall 84 over which the chart 32 is placed. Mounted within the housing is a synchronous motor 86 having a shaft 88 which projects into the lower end of a slot 90 in the front housing wall 84. This slot extends generally radially of the motor shaft 88. Extending coaxially from the forward end of the motor shaft is a reduced diameter stem 92 having an enlarged head 94 at its outer end, as shown in FIG. 5. Stem 92 is adapted to receive a button 96 which fits over the stem head 94 with a snap fit. Button 96 has a circular flange 98 which confronts a resilient ring 100, such as an O-ring, fixed in a coaxial groove in the forward end of the motor shaft 88. Extending forwardly from the motor shaft through this ring, to a position slightly forward of the ring, are tapered pins 102. Chart 32 has a central circular opening which is dimensioned to fit closely on the cylindrical shank of the button 96, to the rear of the button flange 98. The chart is thereby gripped between the resilient ring 100 on the motor shaft 88 and the button flange 98 and is penetrated by the pins 102 on the motor shaft, whereby the chart is driven in rotation by the motor 86. As shown in FIG. 5, the radius of the chart 32 is somewhat greater than the length of the slot 90 in the front wall 84 of the recorder housing 82, whereby the chart fully overlies the slot.

The chart retaining button 96 extends through and is secured to a transparent plate 104 which overlies the upper portion of the chart 32, when the latter is in position on the recorder 28. The upper edge of the plate 104 is pivotally connected to the front wall 84 of the recorder housing 82 by hinges 106 (FIG. 1). The transparent cover 104 and the chart retaining button 96 carried thereby may thus be rotated between their normal position of FIG. 1, wherein the button is engaged with the motor shaft 88 to retain the chart 32 in driving engagement with the shaft, and a horizontal position 104a in FIG. 3, wherein the button is disengaged from the motor shaft to permit the chart to be replaced. Preferably, the hinges 106 are spring loaded in a direction to urge the plate against the outer surface of the chart.

Figure 2:
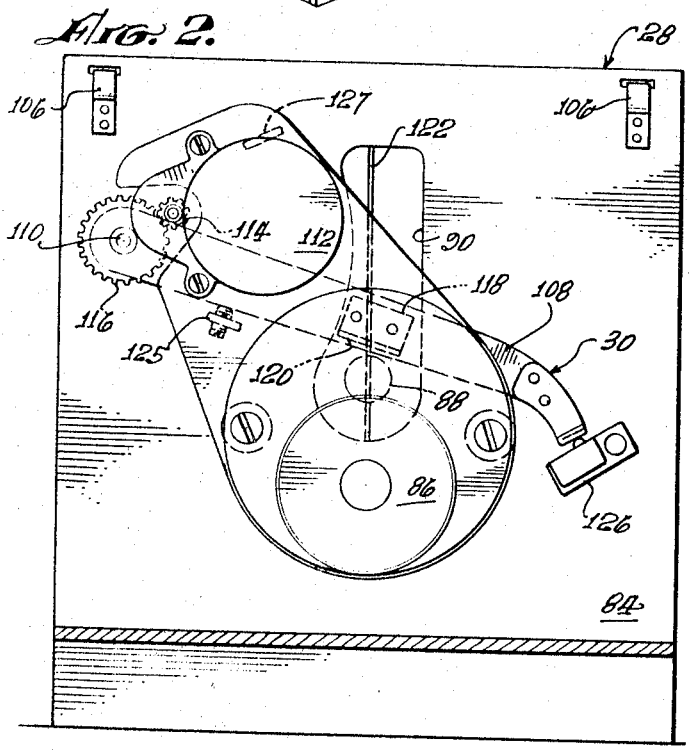
FIG. 2 is a rear elevation of the recording apparatus as indicated by line 2—2 in FIG. 1.
Figure 3:
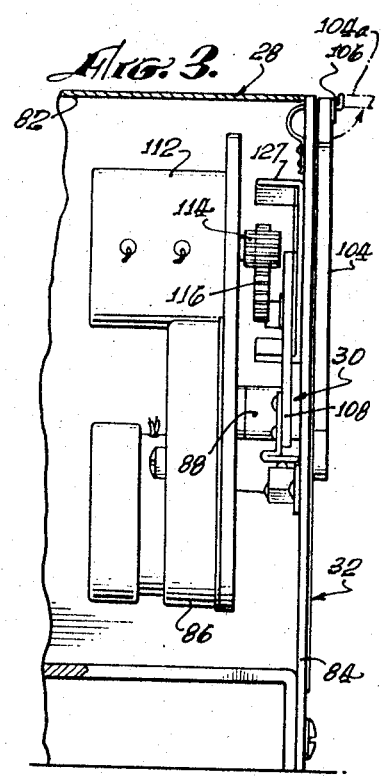
FIG. 3 is a side elevation of the recording apparatus viewed from the right in FIG. 2 with the housing removed.

As shown in FIG. 2, the oscillatory recording member 30 comprises an arm 108 which is pivotally mounted at one end on the front wall 84 of the recorder housing for swinging about an axis 110 parallel to the axis of rotation of the chart 32. Mounted within the recorder housing, adjacent the pivoted end of the recorder arm 108, is a synchronous reversible stepping motor 112, on the output shaft of which is fixed a pinion 114. Pinion 114 meshes with a larger pinion 116 fixed to the recorder arm, coaxially with its pivot axis 110. It is apparent, therefore, that the stepping motor 112 is effective to rotate the recorder arm about its pivot axis 110. As shown in FIG. 2, the pivot axis of the recorder arm is located to one side of the slot 90 in the front wall 84 of the recorder housing and the recorder arm extends transversely across this slot. Fixed to the forward surface of the recording arm, in line with the slot 90, is a bracket 118 having a forwardly directed flange-like blade 120 which projects forwardly through the slot into contact with the rear surface of the recording chart 32. Rotation of the recorder arm 108 by the reversible stepping motor 112 is effective to wipe the blade 120 generally radially across the rear surface of the chart. Fixed to the inner surface of the transparent cover plate 104 is a relatively narrow supporting member or track 122 which extends radially across and in contact with the front surface of the chart 32, in line with the generally radial direction line of movement of the blade 120 on the recorder arm 108. Track 122 may comprise, for example, a relatively stiff wire which is fixed at its ends to the cover plate 104. Preferably, the central portion of the track 122 is spaced slightly from the cover plate to permit the central portion of the track to yield forwardly.

At this point, it is apparent that rotation of the recorder arm 108 about its pivot axis 110 is effective to move the blade 120 on the arm along the supporting track 122. The recorder arm and supporting track are mounted in such a way that the chart 32 is pressed between the track and the leading edge of the blade as the latter wipes radially across the rear surface of the chart during rotation of the arm. Accordingly, the track, in effect, exerts a pressure on the front surface of the chart in the restricted region of the chart located directly between the leading edge of the blade and the track, that is, at the point where the track crosses the leading edge of the blade. During rotation of the recorder arm about its pivot axis 110, this pressure point on the chart travels radially across the chart. The exposed front surface of the chart 32 comprises a pressure sensitive recording surface which is so constructed that the traveling pressure point, just mentioned, produces a recording visible on the front surface of the chart.

Recording charts with various type sof pressure sensitive recording surfaces may be used on the present recorder. One type of chart that may be used, for example, comprises an underlying surface of one color which is coated with a layer of material, such as wax, of a different color in such manner that when the wax coating is scraped away, the underlying surface of contrasting color is exposed, thereby to form a visible mark on the chart. Alternatively, the chart may be constructed of one of the well-known recording medias which are impregnated with microscopic beads of ink which rupture in response to pressure and thereby produce a mark visible on the front surface of the chart. It is also conceivable that the main body of the chart may comprise a transparent material and that the recording member 30 may comprise a stylus for recording on the rear surface of the chart, which recording would then be visible through the main transparent body of the chart.

Referring now to FIG. 8, it will be observed that electrical power for operating the present monitoring system 24 is supplied through leads $L_1$ and $L_2$. The terminals of the chart drive motor 86 are directly connected to the leads $L_1$ and $L_2$, respectively, so that the chart motor is continuously energized, to drive the chart 32 in rotation, whenever the leads $L_1$ and $L_2$ are energized. The reversible synchronous stepping motor 112 driving the recorder arm 108 comprises two windings 112a and 112b. Winding 112a, when energized, is effective to rotate the motor shaft in a direction to rotate the recorder arm 108 outwardly, relatively to the rotation axis of the chart, from the position of the recorder arm shown in FIG. 2. This position of the recorder arm is hereinafter referred to as its initial or starting position. The second motor winding 112b, when energized, is effective to drive the recorder arm in the reverse direction, that is, inwardly toward its initial position of FIG. 2. The motor winding 112a which causes outward rotation of the recorder arm is referred to as the forward winding, and the winding 112b which causes inward rotation of the recorder arm is referred to as the reverse winding. One terminal of the forward winding 112a and one terminal of the reverse winding 112b of the recorder arm stepping motor 112 are connected to the supply lead $L_1$. The other terminal of the forward winding 112a is connected to the terminal 26b of the signal generator 26 which, in turn, connects to the stationary contact 72 of the generator. The other terminal of the reverse winding 112b connects to the terminal 26c of the signal generator, which, in turn, is connected to the stationary contact 68 of the generator. Finally, the terminal 26a of the signal generator, which connects to the stationary contact 70, is connected to the supply lead $L_2$. The terminals of the synchronous motor 34 in the signal generator are directly connected to the supply leads $L_1$, $L_2$.

Conductors $L_1$ and $L_2$ are typically part of the usual domestic power supply system providing electric current from a source, not shown, of 60 cycle alternating current. This arrangement takes advantage of the availability of a convenient source of electrical pulses—the alternating current half-cycles—at a frequency that is maintained constant within very close limits of accuracy. Broadly speaking, any pulsating current, alternating or direct, may be used at any suitable frequency. However, practical advantages are gained by using available 60 cycle power since stepping motor 112 and other commercial items of equipment are readily available in designs compatible with this power source. A further advantage is utilization of the present existence of a domestic network of power lines all synchronized in phase, permitting the signal generator to be placed some distance from the stepping motor and recorder without sacrifice of accuracy.

The stepping motor has the advantageous characteristic that the rotor advances through a known angle for each electrical pulse received, either negative or positive. Hence it responds equally to each of 120 pulses per second contained in domestic 60 cycle alternating current. It stops each time the polarity of the current reverses. Each stop is substantially without coasting so that for a given number of pulses, i.e., half cycles of the alternating current supplied, it advances through a predictable total angle. Such a motor becomes a highly accurate instrumentality for converting electrical pulses into mechanical motion. Since the rotor responds to each pulse, it is in effect a digital counter that counts the number of pulses received at winding 112a and converts the count into a corresponding angular motion of the motor output shaft and pinion 114. The half cycles of the alternating current energizing motor 112 are referred to generically as pulses; and the group of pulses counted to measure the flow rate in conduit 20 is denoted $P_1$ in FIG. 9 and is received as a continuous or uninterrupted series during each measuring cycle C. It is thus apparent that the nmber of pulses in a group $P_1$ determines the time length of the group and of the increment $T_1$; and also that the pulse count bears a direct linear relation to the angular motion of the output shaft of motor 112 because of the character of the stepping motor.

The operation of the illustrated monitoring instrument 24 will now be described. In the following description, it is assumed that the recorder arm 108 initially occupies the position of FIG. 2. When electrical power is applied to the leads $L_1$, $L_2$, the synchronous motor 34 of the signal generator 26 is energized to drive the generator discs 50, 52 at constant equal speeds in opposite directions of rotation. The chart motor 86 of the recorder 28 is also energized to drive the recording chart 32 in rotation at a selected constant speed, typically one revolution in twelve or twenty-four hours. The flow rate transducer 22 responds to flow of fluid through the conduit 20 by angularly positioning the rotary input shaft 62 of the signal generator 26 in accordance with the flow rate. The contacts 64, 66 of the signal generator are thereby angularly positioned relative to the counter-rotating contact discs 50, 52.

It will be recalled from the earlier description of the signal generator 26 that when the contact discs 50, 52 of the generator are driven in opposite directions of rotation, the input shaft 62 of the generator is angularly adjustable between a first limiting position, wherein the electrical circuit to motor winding 112a through the signal generator, between stationary contacts 70 and 72, remains open throughout a full 360° of rotation of the contact discs, and a second limiting position, wherein the latter circuit is alternatively closed for slightly less than 90° rotation of the contact discs (i.e., about 85° in the illustrated embodiment) and opened for more than 90° of rotation of the discs (i.e., about 95° in the illustrated embodiment) twice during each revolution of the discs. If the signal generator input shaft 62 is set in some angular position intermediate the two limiting positions, the circuit through the generator between the contacts 70, 72 continues to be alternately opened and closed twice during each revolution of the contact discs. In this case, however, the circuit remains closed, each time, for some angle of rotation of the discs between 0° and 85°, depending upon the setting of the input shaft. It will be further recalled from the earlier description of the signal generator that the electrical circuit to reverse winding 112b through the generator between contacts 68 and 70 is alternately closed for 90° of rotation of the discs and opened for 90° or rotation of the discs twice during each revolution of the discs in such manner that each closure of the latter circuit occurs in the interval between successive closures of the circuit between the generator contacts 70, 72.

At this point it may be remarked that the signal generator design is not limited to one in which the circuits mentioned are opened and closed twice for each revolution of discs 50 and 52. Two contacts 74a and 74b are advantageous, but by changing their number the circuits to windings 112a and 112b may be closed more or less often than two times for each revolution of discs 50, 52.

Referring now to FIG. 8, it is apparent that each completion of the generator circuit between the generator contacts 70 and 72 energizes the forward winding 112a of the recorder arm drive motor 112, thereby to cause the motor to drive the recorder arm 108 away from its initial position of FIG. 2 and radially outwardly across the recording chart 32. Similarly, it is apparent that each completion of the generator circuit between the generator contacts 68 and 70 energizes the reverse winding 112b of the recorder arm motor, thereby to cause the motor to return the recorder arm radially inwardly toward the initial position of the arm. The distance through which the recording arm blade 20 travels along the chart supporting track 122 during each outward measuring stroke of the recording arm, and, therefore, the length of the visible line produced on the recording chart 32 by such outward stroke of the arm, is proportional to the time duration of the measuring group of pulses $P_1$ from the signal generator 26 which energizes the forward winding 112a. This signal length, in turn, is directly proportional to the angular velocity of the signal generator contact discs 50, 52 and to the angular position of the input shaft 62 of the generator. Since the speed of the generator motor 34, and therefore of discs 50 and 52, is constant, the length of each energizing signal to the forward motor winding 112a becomes a function of the angular position of the input shaft, which angular position is related to and determined by the flow rate in the conduit 20. According to the preferred practice of the invention, the construction of the flow rate transducer 22 and its connection to the input shaft 62 of the signal generator are such that the shaft is displaced angularly by the transducer in linear relation to flow rate, and in such manner that at some arbitrarily selected minimum flow rate, the shaft occupies one of its limiting positions, mentioned earlier, and at some arbitrarily selected maximum flow rate, the shaft occupies its other limiting position. Under these conditions, the distance traveled by the recording arm wiper 120 along the recording chart supporting track 122, during each successive outward measuring stroke of the recording arm 108, varies linearly with the flow rate in the conduit 20. The recording chart 32, of course, is driven in rotation during these successive recording strokes of the recording arm, whereby there is produced on the front recording surface of the chart a two-tone recording of the kind illustrated in FIG. 4. The damarcation or boundary B between the two contrasting areas or fields of the chart measures the flow rate in the conduit 20.

The pulse groups $P_2$ which energize the reverse winding 112b of motor 112 are equal in length and correspond to 90° of rotation of the generator contact disc 50. It is further apparent that this common length of the pulse groups $P_2$ is greater than the maximum length of the period $P_1$ during which the forward winding 112a is energized. Accordingly, each energizing group $P_2$ to the reverse winding 112b is effective to drive the recording arm 108 through a greater angle than any group $P_1$ energizing the forward winding 112a. This assures full return of the recording arm to its initial position following each outward measuring stroke of the arm.

However, because of the potentially greater length of each inward return stroke of the recording arm, it is necessary to stop the arm at its initial position at the conclusion of each return stroke of the arm. This may be accomplished in various ways. For example, inward movement of the recording arm may be limited by a stop, such as the adjustable stop 125 shown in FIG. 2. Where such a stop is used by itself, it is necessary to provide a slip coupling between the recorder arm 108 and the shaft of the recorder arm drive motor 112 to permit the motor shaft to continue to rotate during the brief interval between engagement of the recording arm with the stop and the end of the current $P_2$ energizing signal to the reverse winding 112b. According to the preferred practice of the invention, however, each inward return stroke of the recording arm is also limited by engagement of the arm with a limit switch 126, mounted on the forward wall 84 of the recorder housing, and connected in series with the reverse winding 112b of the recorder arm drive motor, as shown in FIG. 8. Engagement of the recorder arm with this switch de-energizes the latter, thereby to terminate inward driving of the arm. The stop 125 is preferably retained under these conditions to positively locate the shaft in its initial position. An outer stop 127 may also be provided, if desired, to limit each outward recording stroke of the recording arm.

The duration of pulse group $P_2$ of each cycle is longer than the maximum duration of each group $P_1$ to ensure full return of the recorder arm when, as here, reverse winding 112b is the return means and it is connected to 60 cycle alternating current as is the measuring winding 112a. If other return means are used, the need for this time duration relation may disappear. For example, if winding 112a is energized by current of higher frequency than 60 cycles, e.g., 120 cycles, it turns twice as fast as before, and returns the recorder arm in half the time. Then the duration of pulse group $P_2$ could be reduced to say one-fourth of the duration of a cycle C.

It will be apparent that the illustrated monitoring instrument 24 may be utilized for monitoring other input functions than flow rate, such as the input functions mentioned earlier. In the event that in any of these various applications, the angle of rotation, or travel, of the recording arm 108 during the successive outward recording strokes thereof varies inversely with the input function, the scale on the chart 32 may be so arranged that the recording arm travels from the high end of the recording range on the chart toward the low end of the range, in the manner disclosed in my co-pending application Ser. No. 458,603, filed May 25, 1965, for Monitoring and Recording System, now abandoned thereby to, in effect, invert the recording and provide a resultant trace which is directly related to the monitored function.

Since the recording arm 108 of the present recorder 28 engages the rear of the chart 32, the front recording face of the chart is substantially completely exposed and, therefore, the chart may be read from any position. The two-tone configuration of the recording on the chart, wherein the input function is defined by the demarcation or boundary B between two solid contrasting areas, may be accurately read at substantially greater distances than a conventional chart bearing a narrow line trace. If desired, the transparent cover plate 104 which overlies the recording chart 32 may be equipped with a scale against which the chart may be read. This scale may be inscribed on the inner surface of the cover plate adjacent the chart, whereby the chart may be read from any angle without parallax error.

Figure 9:
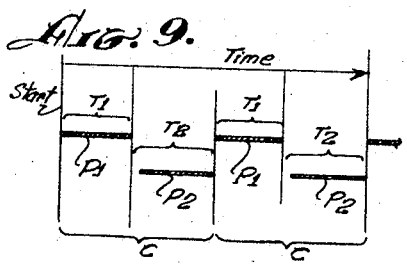
FIG. 9 is a graphical illustration of the modulated signal produced in the present system.

At this point, therefore, it is evident that the invention provides a monitoring method and means wherein the input function being monitored is translated, by the signal generator 26, into a signal composed of successive cycles C, FIG. 9, each defining two successive increments of time $T_1$ and $T_2$. The cycles C occur at a constant frequency determined by the angular velocity of the signal generator contact discs 50, 52. The invention finds particular application when the cycle frequency is of the general order of magnitude of ten or less per minute, for example four. Much depends on how often it is necessary to update the function being monitored. In a water storage reservoir, for example, a frequency of one or a few times hourly may be adequate while in a pipe line flow may be monitored at two second intervals. According to the invention, selected time increments of the output signal from the signal generator, namely, the increments $T_1$ are the time increments of the individual cycles that vary in a predetermined relation to said input function. Ordinarily, these increments $T_1$ are alternate time increments of the signal emitted by the signal generator. In other words, they are portions of consecutive cycles, as in FIG. 9. It will be realized that in a broader sense the invention is not necessarily limited to alternate time increments taken from consecutive cycles since the selected time increments may be those occurring in other than consecutive cycles. For example, only alternate cycles may be recorded.

Each cycle is composed of two time successive increments $T_1$ and $T_2$, making the time length of a single cycle equal to the sum of the duration of these two components. The time increment $T_1$ is varied in length and is equivalent to the pulse group $P_1$ which is utilized to measure the input function. The time increment $T_2$ contains the pulse group $P_2$ which in the embodiment described is utilized to return the recording stylus to its initial or starting position. However, in a broader sense, the invention is not limited to the presence of electric pulses in the second time increment $T_2$ since, in the absence of an electric current energizing the reverse winding of the motor, the stylus may be returned during $T_2$ to its initial position by mechanical means, for example, by a spring.

The pulse group $P_1$ occurring during $T_1$ has a variable duration which is a function of the flow rate in conduit 20. Although this means that the remaining time increment $T_2$ is also variable, since it is equal to the length of a cycle minus the duration of $T_1$, it will be noticed that the second pulse group $P_2$ is of constant length. This is a result of the fact that the two discs 50 and 52 are driven at a constant rotational speed and the length of each pulse group $P_2$ is determined by the fixed angular extent of segments 74b which each have a 90° length. Accordingly, in the preferred embodiment of the present invention, the pulse group $P_2$ is longer than the pulse group $P_1$ which is of variable length, the pulse group $P_2$ occupying substantially half of the length of a complete cycle.

For practical reasons, there is a short time interval between pulse groups $P_1$ and $P_2$. This occurs because of the mechanical nature of the brushes and contacts and because it is desirable that the pulse group $P_1$ energizing the forward winding of the motor be definitely terminated before the reversing pulse group $P_2$ is initiated. Since pulse group $P_2$ is constant in length and pulse group $P_1$ is variable in length, it will be appreciated that the interval between pulse groups $P_1$ and $P_2$ in any given cycle, is also variable. These relationships are shown graphically in FIG. 9 for a single value of the time increments $T_1$ and the corresponding pulse group $P_1$. Since the number of pulses in group $P_1$ of each cycle is related linearly to the flow rate in conduit 20, it will be understood that the illustrated relationship exists for only one selected value of time increment $T_1$ approaching the maximum and that the length of this time increment decreases with a decreasing number of pulses in group $P_1$ to a lesser value which is related to a reduced flow rate to be recorded.

It will be apparent from the foregoing description that various changes may occur to persons skilled in the art in the monitoring system illustrated and described above, but without departing from the spirit and scope of the present invention.

I claim:
1. The method of monitoring a variable input function which comprises the steps of:
   generating an electrical signal composed of a series of cycles each of substantially the same time length and each comprising a plurality of pulses of constant frequency,
   each cycle having a group of pulses of which the number of pulses in the group is related in a predetermined manner to the variable input function as a quantitative measure of the function;
   and generating an output function related to the number of pulses in the group.
2. The method of monitoring a variable input function as in claim 1 in which the last-mentioned step involves generating a mechanical output motion over a distance related to the number of pulses in the group.
3. The method of monitoring a variable input function as in claim 2 in which the pulse group of each cycle has a time duration less than the length of a cycle;
   and which method includes reversing the direction of output motion during the remainder of the cycle not filled by the pulse group.
4. The method of monitoring a variable input function which comprises the steps of:
   generating an electrical signal composed of a series of cycles each of substantially the same time length and each comprising a plurality of pulses of constant frequency,
   each cycle having two groups of said pulses, and relating the number of pulses in one group of each cycle in a predetermined manner to the variable input function as a quantitative measure of the function;
   generating an output function related to the time duration of said one pulse group;
   and discontinuing said output function during the other pulse group.

5. The method of monitoring a variable input function which comprises the steps of:
generating an electrical signal composed of a series of cycles each of substantially the same time length and each comprising a plurality of pulses of constant frequency,
each cycle having two groups of said pulses, and relating the number of pulses in one group of each cycle in a predetermined manner to the variable input function as a quantitative measure of the function;
generating a mechanical output motion in a given direction with the pulses of said one pulse group;
and generating a mechanical output motion in a return direction with the pulses of the other pulse group.

6. The method of monitoring a variable input function according to claim 5 in which said one pulse group is of shorter duration than said other pulse group.

7. The method of monitoring a variable input function which comprises the steps of:
generating an electrical signal composed of a series of cycles each of substantially the same time length and each comprising a plurality of pulses of constant frequency,
each cycle having a group of pulses of which the number of pulses in the group is related in a predetermined manner to the variable input function as a quantitative measure of the function;
driving at a constant speed and in a given direction a recording chart having a recording range extending transversely to said direction;
and driving a recording stylus over the chart from one end of said recording range for a distance proportional to the number of pulses in the group to produce on the chart a trace recording the value of the measurement of the input function.

8. The method of measuring a variable input function that includes the steps of:
generating an electric signal having periodic groups of pulses of substantially constant frequency;
varying the number of pulses in each group in a predetermined manner with the quantitative value of the input function being measured;
and generating an output function in visible form related to the number of pulses in each pulse group.

9. The method of measuring a variable input function that includes the steps of:
generating an electric signal having periodic groups of pulses of substantially constant frequency;
varying the number of pulses in each group in a predetermined manner with the quantitative value of the input function being measured;
spacing the groups of pulses apart in time by an interval longer than any pulse group;
generating an output motion at constant speed in a given direction for a length of time equal to the duration of each pulse group;
and generating a reverse motion in the interval between pulse groups.

10. A monitoring system comprising:
sensing means having an electrical current output;
a signal generator connected to the sensing means and responsive to the output current therefrom, the generator including means for generating an electrical signal composed of periodic groups of electrical pulses of substantially constant frequency and means for varying the number of electrical pulses in each group in a manner related to the electrical output of said sensing means;
and means coupled to the output of said generator, and producing an output from the last-mentioned means related to the number of pulses in each group.

11. A monitoring system as in claim 10 in which the last-mentioned means produces a mechanical motion as the output.

12. A monitoring system as in claim 11 in which the last-mentioned means includes means moving a recording element at a constant speed in a given direction and means limiting each movement of the recording element in said direction to the time duration of a pulse group.

13. A monitoring system comprising:
sensing means having an electrical current output;
a signal generator connected to the sensing means and responsive to the output current therefrom, the generator including means for generating an electrical signal composed of periodic groups of electrical pulses of substantially constant frequency and means for varying the number of electrical pulses in each group in a manner related to the output of said sensing means;
and recording means coupled to the output of said signal generator and in turn producing a variable output movement having a time duration related in a known manner to the pulse count of each pulse group.

14. A monitoring system, comprising:
sensing means including an output shaft and means producing a variable angular displacement of said shaft between two limiting positions proportional to a value to be measured;
an electrical signal generator connected to said shaft and to a source of electrical current having pulses at a constant frequency, said generator including means for periodically delivering said current pulses for intervals each including a plurality of pulses and having a time duration determined by the angular displacement of said shaft;
and recording means having a movable recording member moved in a predetermined direction for a distance proportional to the number of pulses in each delivery period.

15. A monitoring system as in claim 14 in which the source of electrical current is a source of 60 cycle alternating current.

16. A monitoring system, comprising:
sensing means including an output shaft and means producing a variable angular displacement of said shaft between two limiting positions proportional to a value to be measured;
an electrical signal generator connected to said shaft and to a source of electrical current having pulses at a constant frequency, said generator including means for generating a signal composed of successive cycles, each cycle comprising two groups of pulses of which the number of pulses in one group is related in a predetermined manner to the angular displacement of said shaft;
and recording means including means moving the recording member in a predetermined direction for a distance proportional to the number of pulses in said one group of each cycle, and means returning the recording member to the starting position by pulses in the remainder of each cycle.

17. A monitoring system, comprising:
fluid flow sensing means having an output shaft displaced angularly from a starting position in a known relation to a flow to be recorded;
a source of electrical current having pulses at a constant frequency;
an electric switch connected electrically to said current source and mechanically to said output shaft;
switch operating means placing said switch in an on position periodically to transmit said pulses for a time interval determined by the angular displacement of the output shaft;
a recording member movable in a predetermined direction to record said fluid flow;
and motor means moving said recording member away from an initial position and in said direction and energized by said pulses for a time interval proportional to the number of pulses in each transmission interval, whereby the length of movement of said recording member in said direction is related in a predetermined manner to said fluid flow.

18. A monitoring system as in claim 17 in which the motor means is a stepping motor advancing a constant amount for each pulse received.

19. A monitoring system as in claim 17 in which the switch transmits pulses after said time interval, and the motor means is reversible, the motor means being energized in a reverse direction by the last-mentioned pulses after said time interval to return the recording member to its initial position.

20. In combination:
a signal generator including means for generating a signal composed of successive cycles each comprising two successive groups of pulses, and means for selectively regulating the time duration of a given pulse group in each of said cycles,
a recorder coupled to said signal generator including an oscillatory stylus having a given initial position, first means responsive to said given pulse group for driving said stylus from said initial position in response to each said given pulses at a predetermined rate and for an interval of time related to the number of pulses in the given group, and means responsive to the pulses of the other pulse group of each cycle for driving said stylus back to said normal position in response to each said other pulse group.

21. The combination according to claim 20 wherein: said given pulse group of each cycle of said signal has a maximum time duration less than one-half the total time duration of each cycle.

22. The combination according to claim 20 wherein: each said given pulse group of said signal has a maximum time duration less than one-half the total time duration of each cycle, and the time duration of the remaining pulse group of each cycle is constant and substantially equal to one-half the total time duration of each cycle.

23. In combination:
a signal generator including means for generating a signal composed of a series of cycles each defining successive increments of time having a total time duration equal to the time duration of the respective cycle, and means for selectively regulating the time duration of given alternate time increments of said cycles,
recorder means coupled to the output of said signal generator including an oscillatory stylus having a given initial position, a reversible motor coupled to said stylus for driving the latter including a first winding operatively connected to said signal generator to be energized by each said given signal increment for driving said stylus in one direction from said initial position, and a second winding operatively connected to said signal generator to be energized during each intervening signal increment for driving said stylus in the opposite direction back to said initial position, and
each said given signal increment having a maximum time duration not exceeding one-half the total time duration of each cycle, whereby each said remaining signal increment is effective to return said stylus to said initial position.

References Cited

UNITED STATES PATENTS

| | | | |
|---|---|---|---|
| 2,428,222 | 9/1947 | Hughes | 340—206 |
| 2,451,129 | 10/1948 | Ghynell | 340—206 |
| 2,491,389 | 12/1949 | Narcross | 346—123 X |
| 2,746,834 | 5/1956 | McClean | 346—139 X |
| 3,304,554 | 2/1967 | Helm | 346—62 |

RICHARD B. WILKINSON, *Primary Examiner.*

JOSEPH W. HARTARY, *Assistant Examiner.*

U.S. Cl. X.R.

73—194; 340—206; 346—123